US010156486B2

(12) United States Patent
Rohden

(10) Patent No.: US 10,156,486 B2
(45) Date of Patent: Dec. 18, 2018

(54) SHIP COMPRISING A MAGNUS ROTOR AND FORCE-MEASURING DEVICE

(75) Inventor: Rolf Rohden, Aurich (DE)

(73) Assignee: Wobben Properties GmbH, Aurich (DE)

( * ) Notice: Subject to any disclaimer, the term of this patent is extended or adjusted under 35 U.S.C. 154(b) by 435 days.

(21) Appl. No.: 13/821,222

(22) PCT Filed: Sep. 8, 2011

(86) PCT No.: PCT/EP2011/065518
§ 371 (c)(1),
(2), (4) Date: May 23, 2013

(87) PCT Pub. No.: WO2012/034916
PCT Pub. Date: Mar. 22, 2012

(65) Prior Publication Data
US 2013/0233223 A1  Sep. 12, 2013

(30) Foreign Application Priority Data
Sep. 16, 2010 (DE) .................. 10 2010 040 905

(51) Int. Cl.
*B63H 9/02* (2006.01)
*G01L 1/22* (2006.01)
*G01L 5/00* (2006.01)

(52) U.S. Cl.
CPC ............ *G01L 1/22* (2013.01); *B63H 9/02* (2013.01); *G01L 1/2225* (2013.01); *G01L 5/00* (2013.01); *Y02T 70/58* (2013.01)

(58) Field of Classification Search
CPC ...................................... B63H 9/02

USPC .............................................. 114/39.3; 416/4
See application file for complete search history.

(56) References Cited

U.S. PATENT DOCUMENTS

| 3,695,096 | A |  | 10/1972 | Kutsay |  |
|---|---|---|---|---|---|
| 4,342,539 | A | * | 8/1982 | Potter | F03D 7/06 416/132 B |
| 4,398,895 | A | * | 8/1983 | Asker | B63H 9/02 416/4 |
| 4,602,584 | A | * | 7/1986 | North et al. | 114/39.3 |
| 5,336,854 | A |  | 8/1994 | Johnson |  |
| RE39,838 | E | * | 9/2007 | McDearmon | 73/795 |

(Continued)

FOREIGN PATENT DOCUMENTS

| DE | 202009009904 U1 | 1/2010 |
|---|---|---|
| JP | 63-025196 A | 2/1988 |

(Continued)

OTHER PUBLICATIONS

Satchwell, C.J., "Windship Technology", Studies in Wind Engineering and Industrial Aerodynamics, vol. 4A, p. 91 (Apr. 25, 1985).

*Primary Examiner* — Andrew Polay
(74) *Attorney, Agent, or Firm* — Seed Intellectual Property Law Group LLP

(57) ABSTRACT

The invention concerns a ship, in particular a cargo ship, comprising at least one Magnus rotor for driving the ship, which has a stationary carrier. The invention concerns in particular a ship in which arranged on the carrier is a measuring device for determining a flexural loading on the carrier.
The invention further concerns a method of determining the thrust of a Magnus rotor, a Magnus rotor and a carrier for mounting a Magnus rotor.

12 Claims, 4 Drawing Sheets

(56) References Cited

U.S. PATENT DOCUMENTS 7,874,797 B2 * 1/2011 Pierce et al. ................ 416/1
8,230,798 B2     7/2012 Wobben
8,601,964 B2    12/2013 Wobben

FOREIGN PATENT DOCUMENTS

| JP | 05-213271 A    | 8/1993  |
|----|----------------|---------|
| JP | 2003-293388 A  | 10/2003 |
| JP | 2005-225271 A  | 8/2005  |
| JP | 2008-020278 A  | 1/2008  |
| TW | 221490 A4      | 1/1982  |
| WO | 2006133950 A2  | 12/2006 |
| WO | 2007137844 A2  | 12/2007 |

* cited by examiner

SHIP COMPRISING A MAGNUS ROTOR AND FORCE-MEASURING DEVICE

TECHNICAL FIELD

The present invention concerns a ship, in particular a cargo ship, comprising at least one Magnus rotor for driving the ship, which has a carrier for mounting the Magnus rotor. The invention further concerns a Magnus rotor and a carrier for mounting the Magnus rotor.

DESCRIPTION OF THE RELATED ART

Magnus rotors are also known as Flettner rotors or sailing rotors. Ships with Magnus rotors as a drive are known in the state of the art. By way of example such an arrangement is known from the book "The Sailing Machine" by Klaus D Wagner which appeared in Erst Kabel Verlag GmbH, Hamburg, 1991.

WO 2006/133950 discloses a more developed ship having a plurality of Magnus rotors, wherein associated with each of the Magnus rotors is an individually actuable electric motor for rotating the Magnus rotor.

WO 2007/137844 discloses a further development of a Magnus rotor.

Magnus rotors are used inter alia to provide an additional drive force on a ship, utilizing the Magnus effect. The Magnus effect describes the occurrence of a transverse force as a consequence of an afflux flow to a cylinder rotating about its longitudinal axis with a fluid. The transverse force acts perpendicularly to the afflux flow direction. The flow around the rotating cylinder can be viewed as a superimposition of a homogeneous flow and an eddy around the body. The irregular distribution of the overall flow affords an asymmetrical distribution of pressure at the cylinder periphery. The ship is thus provided with rotating or turning rotors which in the flow of the wind generate a force perpendicular to the effective wind direction, that is to say the wind direction which is corrected with the highest speed. The force produced can be employed similarly as when sailing for propelling the ship. In that case the transverse force is produced towards the side on which the rotating surface of the cylinder and the air flowing therearound move in the same direction.

The rotor has to be fixedly connected to the body of the ship to transmit the transverse force thereto. In known rotors that is effected by means of a carrier for mounting a Magnus rotor, on which the rotor is rotatably mounted. The carrier for mounting the Magnus rotor is in that case usually designed to carry the forces acting radially on a bearing. The magnitude of the transverse force produced by the Magnus rotor is dependent on the size of the rotor and its speed of movement on the one hand and the speed of the wind flowing around the rotor on the other hand. In addition to the transverse force produced by the Magnus rotor itself, it will be noted that the force of the wind which acts on the surface of the rotor that is in opposite relationship thereto additionally also acts on the rotor.

It is desirable to know the forces acting on a Magnus rotor and in particular the forces acting on the carrier for mounting the Magnus rotor to avoid damage due to overloading. In addition it is desirable to be able to determine the direction of the forces acting on the rotor and the direction of the forces acting on the mounting in order thereby to be able to implement control of the rotor in dependence on the wind direction.

Both have only an unsatisfactory outcome in the case of the Magnus rotors known in the state of the art as at least the wind direction has to be determined for that purpose. The latter is only possible with an unsatisfactory degree of accuracy.

BRIEF SUMMARY

One or more embodiments of the present invention is to provide a ship, a Magnus rotor, a carrier for mounting a Magnus rotor.

In a ship of the kind set forth in the opening part of this specification the invention attains that object by the ship being designed with the features of claim 1.

The ship according to one embodiment of the invention has a measuring device which is arranged on the carrier for mounting the Magnus rotor and is adapted to determine a flexural loading on the carrier for mounting the Magnus rotor.

In that respect the invention makes use of the realization that the forces acting on the carrier for mounting the Magnus rotor are firstly carried or produced by the rotor surface of a Magnus rotor, which surface is of a cylindrical configuration, and are then transmitted to the body of the ship by means of the carrier for mounting the Magnus rotor. In that case the forces act on the one hand substantially in a radial direction on the axis of rotation both of the rotor and also of the carrier for mounting the Magnus rotor, but in a direct direction on the connection of the carrier for mounting the Magnus rotor to the ship. Consequently, a flexural moment is produced at the region at which the force is coupled thereinto, and that is carried by the carrier for mounting the Magnus rotor. Accordingly, in the carrier for mounting the Magnus rotor, that situation involves the manifestation of a neutral fiber which is not flexurally loaded while, remote from the neutral fiber, it involves a flexural loading on the carrier for mounting the Magnus rotor. The flexural loading on the carrier for mounting the Magnus rotor can be determined by means of the measuring device and allows direct conclusions to be drawn about the forces acting on the rotor.

One embodiment of the invention provides that the measuring device has two strain gauge sensors which are arranged at a peripheral surface of the carrier and are spaced angularly relative to each other. Preferably the two strain gauge sensors are spaced angularly at an angle of 90° relative to each other. The use of two sensors arranged at different locations advantageously makes it possible to simultaneously ascertain two flexural states at the carrier for mounting the Magnus rotor at different locations along the periphery of the carrier for mounting the Magnus rotor. The strain at the surface of the carrier for mounting the Magnus rotor at the location of the sensor corresponds to the proportion of the flexural loading on the carrier for mounting the Magnus rotor in a radial direction at exactly the location of the sensor. Because two sensors are used, the direction in which the carrier for mounting the Magnus rotor is subjected to a flexural loading can be determined by means of trigonometric relationships. On the assumption that the angle between the two strain gauge sensors is known, the magnitude of the overall flexural loading from the two flexural loading components ascertained at different locations on the periphery can also be determined by means of trigonometric relationships, preferably by means of the Pythagorean theorem.

A first strain gauge sensor is arranged with respect to an axis of rotation of the Magnus rotor in the longitudinal direction of the ship and a second strain gauge sensor is arranged with respect to an axis of rotation of the Magnus rotor in the transverse direction of the ship. That arrangement is particularly advantageous because the first strain gauge sensor which is positioned exactly in the travel direction from the rotor axis also makes it possible to determine the strain or the flexural loading on the carrier for mounting the Magnus rotor exactly in the direction of travel or the longitudinal direction of the ship. The second strain gauge sensor in the meantime makes it possible to determine the strain or flexural loading, orthogonal thereto, in the transverse direction relative to the longitudinal axis of the ship. In that respect strain is used to denote both positive strain—in the sense of stretching—and also negative strain in the sense of compression. Ascertaining the direction from which the force applied to the ship by the Magnus rotor acts as well as the magnitude thereof are markedly simplified by the arrangement of the two strain gauge sensors at a right angle to each other.

In a preferred embodiment the first and second strain gauge sensors are arranged in a horizontal plane. That further simplifies calculation of the flexural loading in respect of direction and magnitude.

In a further preferred embodiment of the present invention the carrier is cylindrical at least in the portion in which the first and second strain gauge sensors are arranged. A cylindrical or optionally a hollow-cylindrical configuration of the carrier for mounting the Magnus rotor in that portion is advantageous in terms of an isotropic flexural behavior. Irrespective of possible structural anisotropies which can be governed by the material used for the carrier for mounting the Magnus rotor, the expectation with a cylindrical configuration for the carrier for mounting the Magnus rotor is that the flexural loading of the carrier for mounting the Magnus rotor always corresponds to a given force, irrespective of the direction from which that force is applied.

In a further advantageous embodiment of the invention the first strain gauge sensor and the second strain gauge sensor are respectively adapted to output a signal representative of the strain detected by the sensors. The data signals outputted by the strain gauge sensors are preferably analog or digital so that further processing of the signals is possible with various methods.

Preferably the ship has a data processing installation for receiving the outputted signals, which is adapted to ascertain a force vector on the basis of the outputted signals. Preferably the data processing installation is adapted to determine the direction of the force vector using the ratio of the strengths of the outputted signals from the first and second strain gauge sensors, and/or to determine the magnitude of the force vector using the ratio of the strengths of the outputted signals and the values of the outputted signals. In that respect the data processing installation preferably uses trigonometric functions and makes use of the following realizations. The signals of the first strain gauge sensor and the second strain gauge sensor represent a strain at the surface of the carrier for mounting the Magnus rotor. The strain in turn corresponds, with respect to the surface or the axis of rotation of the rotor mounting, to a flexural loading on the carrier for mounting the Magnus rotor. That corresponds in turn to a force in the radial direction, which is a force component of the force acting in total on the Magnus rotor. If the angle between the two strain gauge sensors is known and the data processing installation is adapted to determine the two force components (representing the signals outputted by the strain gauge sensors) in the respective directions corresponding to the arrangement of the strain gauge sensors it is also possible on that basis to ascertain the total vector which is composed of the individual components.

Preferably the first strain gauge sensor and/or the second strain gauge sensor each have at least one strain measuring strip and/or strain measuring tube and/or optical strain sensor. In that respect the term strain measuring strip is used to denote for example a wire, film, semiconductor or rosette strain measuring strip. The term strain measuring tube is used to denote a measuring device in which a ferrite core moves within a coil tube corresponding to a strain at the surface at which the measuring device is arranged, whereupon the changed inductance is detected and quantitatively outputted. The optical strain gauge sensor used for example can be a fiber Bragg sensor.

One or more embodiments of the invention further concerns a carrier for mounting a Magnus rotor for a Magnus rotor adapted in particular for driving a ship. The carrier for mounting the Magnus rotor includes a measuring device for determining a flexural loading of the carrier for mounting the Magnus rotor.

The invention further concerns a Magnus rotor comprising a rotor body arranged rotatably on a carrier by means of a bearing, wherein the bearing is preferably adapted to carry forces acting radially on the carrier. The above-mentioned Magnus rotor attains the underlying object insofar as the carrier for mounting the Magnus rotor has a measuring device for determining the flexural loading on the carrier.

The invention further concerns a method of determining the thrust of a Magnus rotor. The method attains the object of the invention insofar as the flexural loading on a carrier for mounting the Magnus rotor is detected by a measuring device adapted thereto.

The method according to the invention is further developed by one or more of the steps: outputting a signal representing the flexural loading on the carrier for mounting the Magnus rotor in the direction of travel of the ship by means of a first strain gauge sensor of the measuring device, determining the force component corresponding to the flexural loading detected by the first strain gauge sensor, as a thrust force, outputting a signal representing the flexural loading on the carrier for mounting the Magnus rotor in the transverse direction of the ship by means of a second strain gauge sensor of the measuring device, determining the force component corresponding to the flexural loading detected by the second strain gauge sensor, as a transverse thrust force, determining the direction of the overall force vector by means of the ratio of the strengths of the outputted signals of the first and second strain gauge sensors, and/or determining the magnitude of the force vector by means of the ratio of the strengths of the outputted signals and the values of the outputted signals. Consequently it is possible by means of the method to ascertain an overall force vector which represents both the strength and also the direction of the force transmitted to the ship by the Magnus rotor.

BRIEF DESCRIPTION OF THE SEVERAL VIEWS OF THE DRAWINGS

The present invention is described in greater detail hereinafter by means of preferred embodiments and with reference to the accompanying drawings in which.

DETAILED DESCRIPTION

Figure 1:
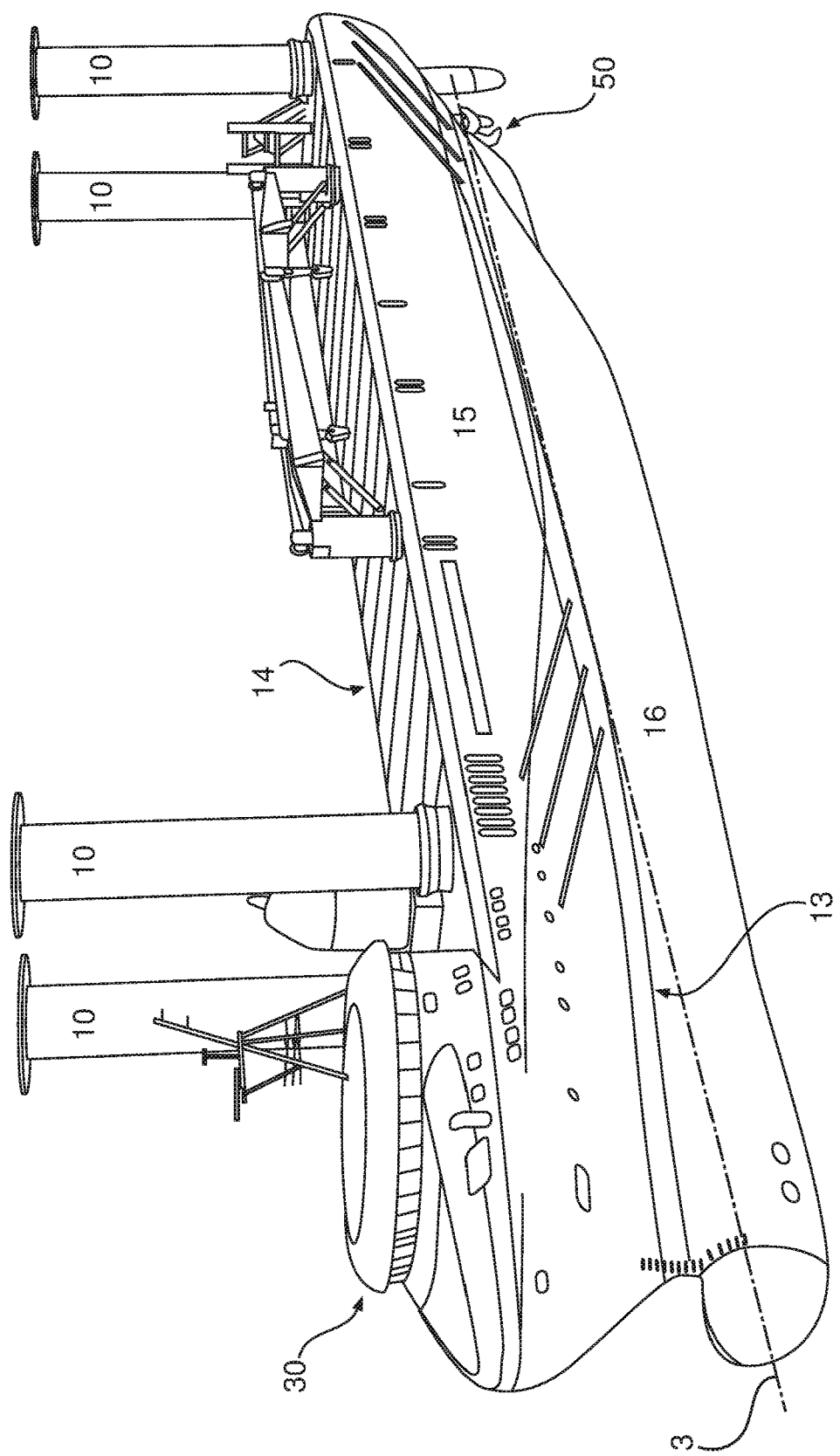
FIG. 1 shows a perspective view of a ship according to the present invention.

FIG. 1 shows a diagrammatic view of a ship 1 according to a first embodiment. The ship 1 in this case has a hull comprising an underwater region 16 and an above-water region 15. The ship 1 can further have for example four Magnus rotors or Flettner rotors 10 which can be arranged at the four corners of the hull. In the forecastle the ship 1 has a bridge 30. The ship 1 has underwater a propeller 50. For improved maneuverability the ship 1 can also have transverse thruster rudders, wherein preferably one is provided at the stern and one to two transverse thruster rudders are provided at the bow. Preferably those transverse thruster rudders are driven electrically. The bridge 30 and all superstructures above the weather deck 14 are of an aerodynamic configuration to reduce wind resistance. That is achieved in particular by sharp edges and sharp-edged structures being substantially avoided. As few superstructures as possible are provided to reduce wind resistance.

The ship 1 in the first embodiment represents in particular a cargo ship designed especially for transporting wind power installations and components thereof. The transport of wind power installations and their corresponding components can be only limitedly implemented with commercially usual container ships as the components of a wind power installation represent a corresponding need for space which does not correspond to the commercially usual container dimensions while the masses of individual components are low in comparison with the space they need. By way of example mention may be made here of rotor blades or pod casings of wind power installations which are predominantly in the form of bulky GRP structures of a few metric tons in weight.

For example, the four Magnus rotors 10 represent in this case wind-operated drives for the ship 1 according to the invention. It is intended that the ship 1 is at least partially driven by the Magnus rotors.

The configuration of the hull of the ship 1 is such that the stern projects as far as possible out of the water. That means on the one hand the height of the stern above the water level but on the other hand also the length of the stern portion which is also suspended above the surface of the water. That configuration serves to detach the water from the hull at an early time to avoid a wave which travels along behind the ship 1 as that leads to a high level of resistance in respect of the hull because that wave caused by the ship 1 is also produced by the machine output power which then however is no longer available to provide forward propulsion.

The bow of the ship 1 is cut off sharply over a relatively long distance. The bottom of the ship, up to a height of about 3 meters above the construction water line, is of a configuration that is optimized in respect of resistance, in regard to hydrodynamic aspects.

Thus the hull of the ship is not designed for maximum loading carrying capacity but for minimum resistance (aerodynamic and hydrodynamic).

The superstructures of the ship 1 are of an aerodynamic configuration. That is achieved in particular by all surfaces being in the form of smooth surfaces. The design configuration of the bridge 30 is intended to avoid in particular trailing wake eddies so that actuation of the Magnus rotors 10 can be effected with as little disturbance as possible. The bridge 30 is preferably arranged at the bow of the ship 1. Arranging the superstructures in the middle of the ship 1 is also possible but would unnecessarily impede loading or discharge of the load as the superstructures would thus be arranged precisely over the middle of the hold.

As an alternative thereto the bridge 30 can be arranged at the stern of the ship 1, that however would be found to be disadvantageous insofar as the Magnus rotors 10 would adversely affect a clear view forwardly.

The drive or propulsion of the ship 1 is optimized for a wind drive so that the ship 1 of the present invention is a sailing ship.

The Magnus rotors 10 can be arranged for example in the region of the corners of the holds so that they can define a rectangular area. It should however be pointed out that another arrangement is also possible. The arrangement of the Magnus rotors 10 is based on a notion that a given rotor area is required to achieve the desired drive power by the Magnus rotors 10. The dimensions of the individual Magnus rotors 10 are reduced by distributing that required surface area to a total of four Magnus rotors 10. That arrangement of the Magnus rotors 10 provides that a continuous area which is as large as possible remains free, which serves in particular for loading and unloading the ship 1 and makes it possible to carry a deck load in the form of a plurality of container loads.

While the ship is shown in the present case as being equipped with four Magnus rotors it is also preferably possible to provide numbers and arrangements of Magnus rotors that differ therefrom, and a different distribution of the drive among the rotors.

The Magnus rotors 10 and the main drive are thus designed in such a way that the main drive, in the event of inadequate wind, only has to provide the difference in power which cannot be delivered by the Magnus rotors 10. Control of the drive is therefore effected in such a way that the Magnus rotors 10 produce the maximum power or approximately the maximum power. An increase in the power of the Magnus rotors 10 thus directly leads to a saving in fuel as no additional energy has to be generated for the electric drive by the main drive. The fuel saving is thus achieved without adaptation being required between a propeller driven by an internal combustion engine or a main drive, and the control of the Magnus rotors 10.

The ship 1 has a weather deck 14. The weather deck is the uppermost deck of the ship and is arranged at the outside. Load goods of the most widely varying kinds can be arranged on the weather deck 14.

The ship 1 has a longitudinal axis 3 arranged parallel to the keel line and extending horizontally. The longitudinal axis 3 therefore corresponds to the direction of travel of the ship 1 when travelling in a straight line (and without the operation of transverse thruster rudders).

Figure 2:
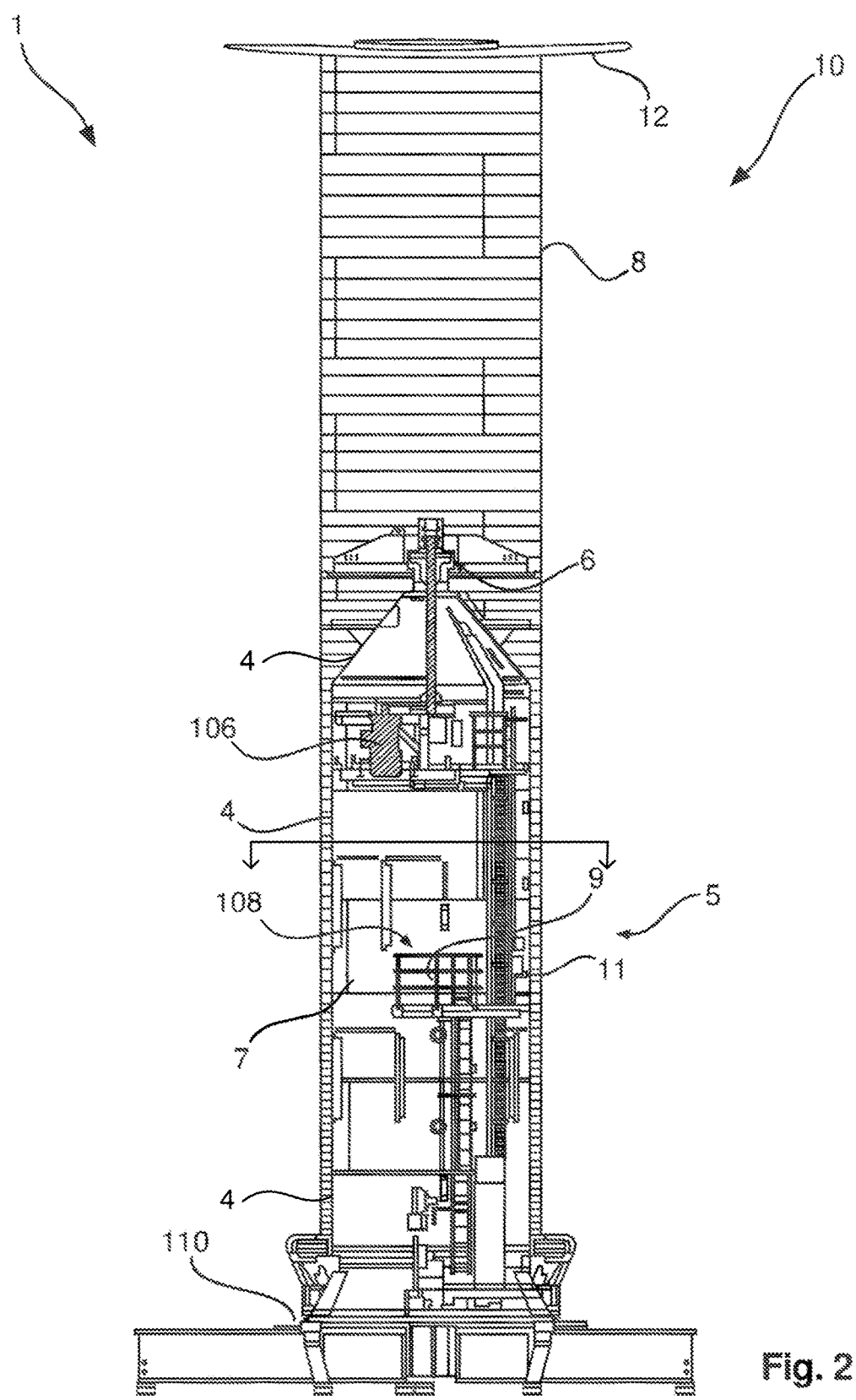
FIG. 2 shows a diagrammatic cross-sectional view of a Magnus rotor according to the present invention.

FIG. 2 shows a sectional view of the Magnus rotor 10 according to the invention of a ship 1. The Magnus rotor 10 has a cylindrical rotor body 8 and an end plate 12 arranged in the upper region. The rotor body 8 is mounted rotatably by means of a bearing 6 at a carrier 4 for mounting a Magnus rotor 10. The carrier 4 is shown generally in outline form with various components mounted therein. A thickness of the carrier 4 is not shown in FIG. 2 but is shown in FIGS. 3-6. The rotor body 8 is connected to a drive engine or motor 106 in an upper region of the mounting 4 by way of force transmission device. The carrier 4 for mounting the Magnus rotor 10 has an inside surface 7. In a lower region of the carrier for mounting the Magnus rotor 10 a measuring device 5 is arranged in the region of the inside wall 7. The measuring device 5 can be reached by means of a working platform 108.

The measuring device 5 is adapted to determine a flexural loading on the carrier for mounting the Magnus rotor, as a consequence of a substantially radial force loading on the bearing 6 by the action of force on the rotor body 8. The measuring device has two strain gauge sensors 9, 11 arranged in the present example at an angle of 90° to each other.

The carrier for mounting the Magnus rotor 10 is connected to the ship's deck by means of a flange connection 110.

Figure 3:
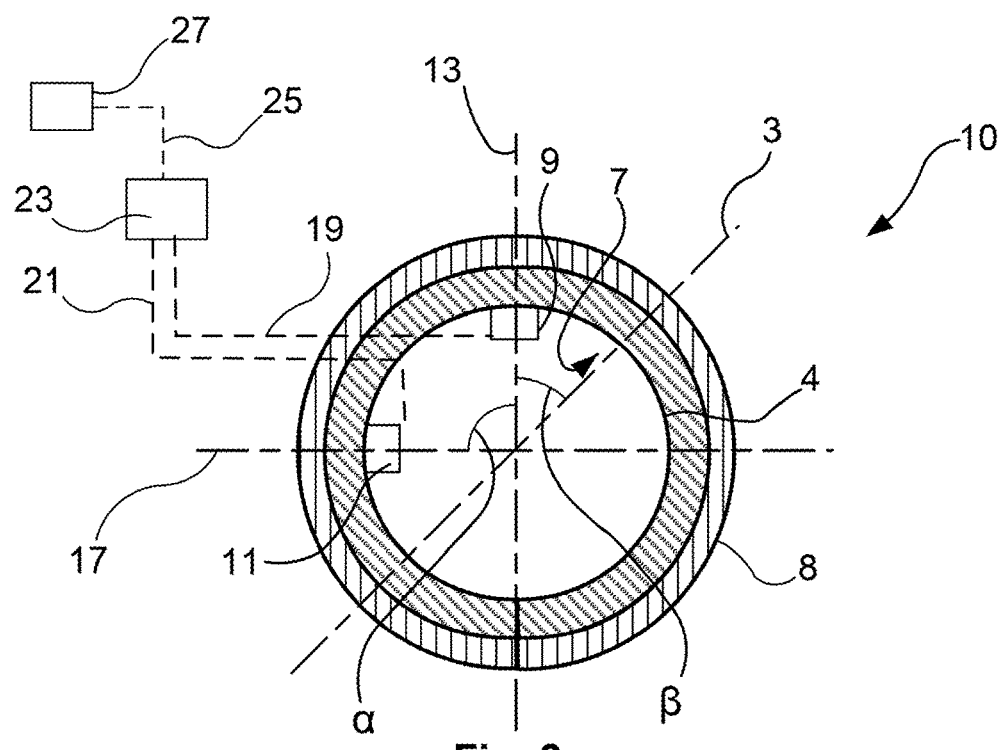
FIG. 3 shows a diagrammatic plan view of a Magnus rotor of a ship having a carrier for mounting the Magnus rotor.

FIG. 3 shows a diagrammatic cross-sectional view through a Magnus rotor 10 according to the present invention. Within the rotor body 8 the Magnus rotor 10 has the carrier 4 for mounting the Magnus rotor 10. A first strain gauge sensor 9 and a second strain gauge sensor 11 are arranged as part of the measuring device at the inside surface 7 of the carrier for mounting the Magnus rotor 10. The first strain gauge sensor 9 is on a first axis 13 viewed from the center point of the carrier for mounting the Magnus rotor 10. The first axis 13 extends at an angle β relative to the longitudinal axis 3 of the ship. In a particularly preferred embodiment the angle β=0°. The second strain gauge sensor 11 is arranged along a second axis 17 at the inside surface 7 of the carrier for mounting the Magnus rotor 10, viewed from the center point of the carrier for mounting the Magnus rotor 10. In a particularly preferred embodiment the angle between the first axis 13 and the second axis 17 α=90°.

The first strain gauge sensor 9 is connected to a data processing installation 23 by a signal line 19. The second strain gauge sensor 11 is connected to the data processing installation 23 by a second signal line 21. The data processing installation 23 is connected to a display device 27 by a third signal line 25. The display device 27 is adapted to display the direction and magnitude of the propulsion force acting on the carrier 4 for mounting the Magnus rotor 10. The data processing analysis is adapted to carry out the method according to the invention.

Figure 4:
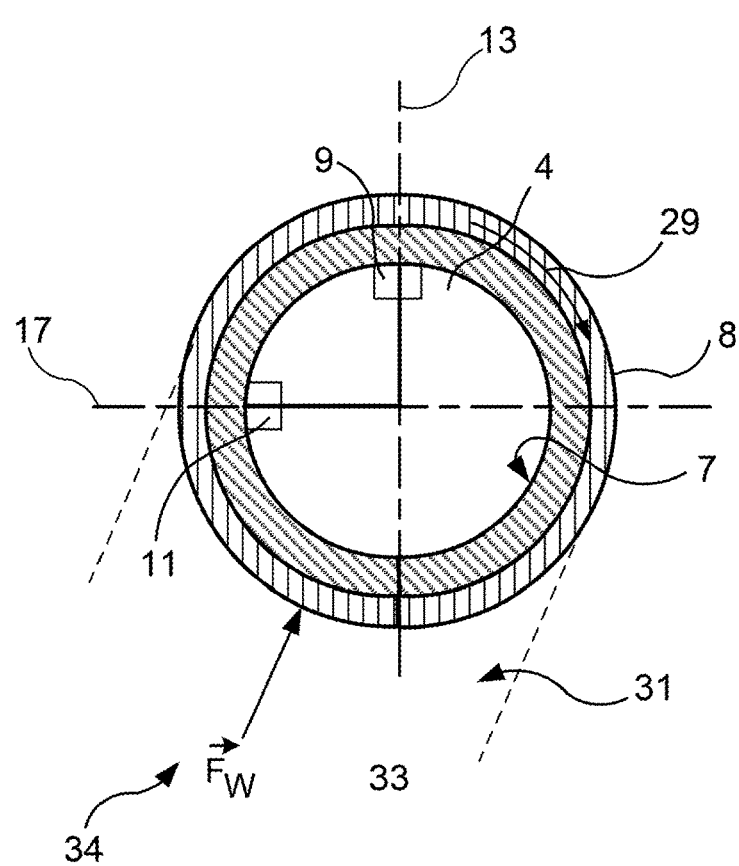
FIG. 4 shows the view of FIG. 3 with a vector diagram.
Figure 5:
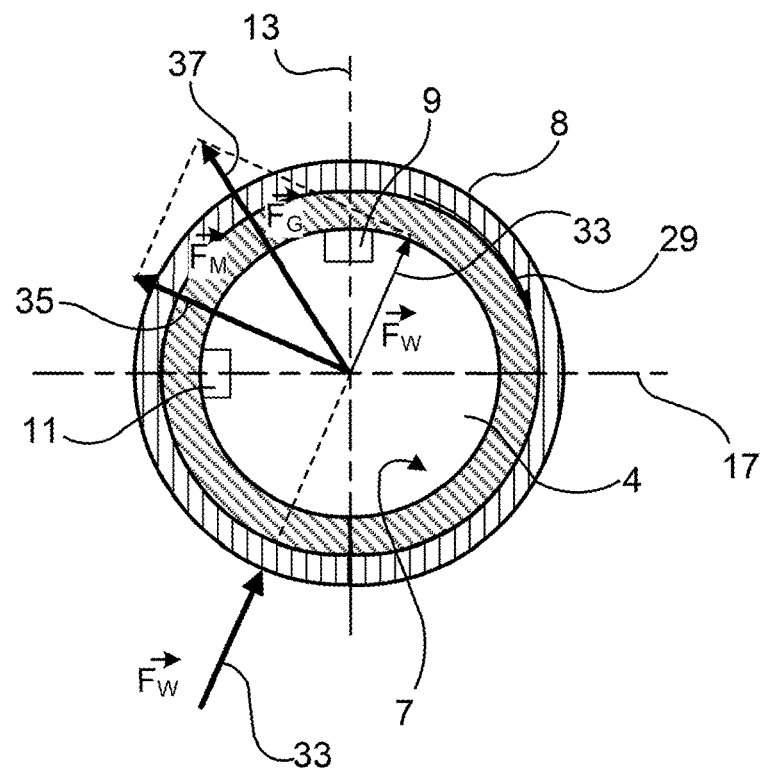
FIG. 5 shows the views of FIGS. 3 and 4 with a vector diagram.
Figure 6:
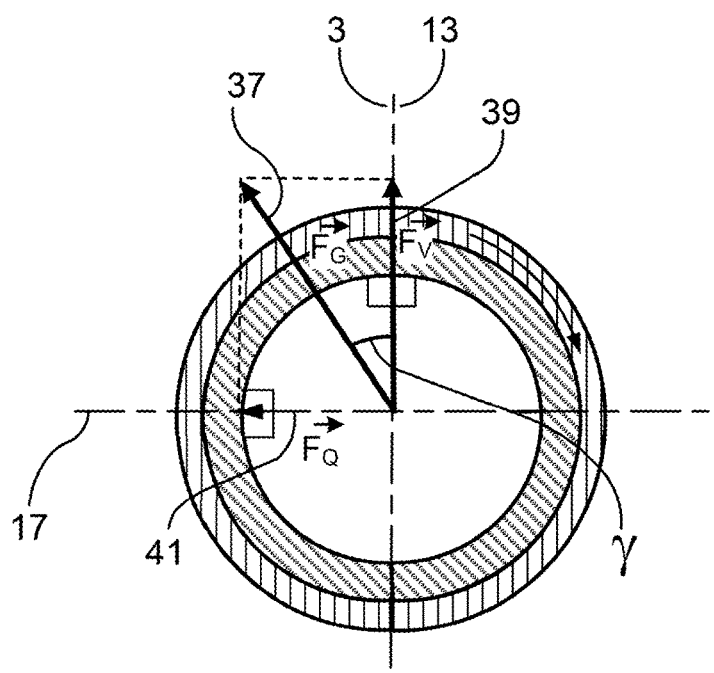
FIG. 6 shows the view from FIG. 5 with an alternative vector diagram.

FIGS. 4 to 6 show in principle the same view as FIG. 3, only the diagrammatically indicated signal lines and the data processing installation as well as the display device have been omitted. The way in which the force acting on the Magnus rotor 10 is interpreted and determined by means of the measuring device will be clearly visible from FIGS. 4 to 6.

Beginning with FIG. 4 it is to be noted that the Magnus rotor 10 has a side remote from the wind and a side 34 towards the wind. The side 34 towards the wind has a surface which receives the wind afflux flow. The direction from which the wind flows against the Magnus rotor 10 differs in that respect from the actual wind direction when considered stationarily as the ship is generally in motion. Wind is incident on the Magnus rotor 10 in the direction of the arrow 33, whereby the Magnus rotor is subjected to the effect of a force, in the direction of the wind. Hereinafter that is referred to as the wind force or for brevity $F_W$. The Magnus rotor 10 rotates in the direction of the arrow 29. As a result, because of the Magnus effect, a force is produced in the direction of an arrow 35, as can be seen from FIG. 5. That force is referred to hereinafter as the Magnus force or for brevity $F_M$. The vector $F_M$ is orthogonal to the vector $F_W$.

Therefore, acting on the carrier for mounting the Magnus rotor 10 is a force which is composed of the wind force $F_W$ on the one hand and the Magnus force $F_M$ on the other hand. Addition of the two vectors $F_W$ and $F_M$ results in a vector for the total force, hereinafter referred to as $F_G$. The vector $F_G$ is in the direction of the arrow 37.

FIG. 6 corresponds to FIGS. 4 and 5, and also FIG. 3 with the exception that the longitudinal axis 3 and the first axis 13, on which the first strain gauge sensor 9 is disposed, coincide in FIG. 6. The total force $F_G$ in the direction of the arrow 37, which has already been derived on the basis of FIGS. 4 and 5, can be interpreted upon vectorial consideration as a sum of two mutually perpendicular vectors. In a particularly preferred embodiment the first strain gauge sensor 9 and the second strain gauge sensor 11 are arranged at a right angle to each other. In the FIG. 6 embodiment the first strain gauge sensor is arranged in the direction of travel and thus in the direction of the longitudinal axis 3 of the ship at the inside of the carrier for mounting the Magnus rotor 10 while the second strain gauge sensor 11 is arranged orthogonally thereto and thus substantially exactly in the transverse direction of the ship, along the second axis 17.

The vector of the overall force $F_G$ can consequently be divided into a vector in the direction of the longitudinal axis 3 or the first axis 13 and a second vector in the direction of the second axis 17. The proportion in the direction of the first axis 13 or the longitudinal axis 3 is identified hereinafter as $F_V$. The vector in the direction of the second axis 17 is identified hereinafter as $F_Q$. In that respect $F_V$ stands for propulsion force and extends in the direction of the arrow 39 while $F_Q$ is to be interpreted as a transverse force and is propagated in the direction of the arrow 41.

Depending on the direction in which the vector $F_G$ acts, the flexural loading detected by the first strain gauge sensor 9 differs from that detected by the second strain gauge sensor 11. The ratio of the flexural loadings in the directions of the arrows 39 and 41 relative to each other changes with an angle γ between the overall force $F_G$ in the direction of the arrow 37 and one of the two axes 13 and 17. In the situation where the flexural loadings detected by the first strain gauge sensor and the second strain gauge sensor 11 are of the same magnitude, the angle between the overall force $F_G$ and the propulsion force $F_V$ γ=45°. In the situation where for example the flexural loading detected by the first strain gauge sensor 9 is twice as great as the flexural loading detected by the second strain gauge sensor 11 the angle of $F_G$ to $F_V$ or the first axis 13 γ=30°.

Formulated in general terms accordingly the angle γ between $F_G$ and $F_V$ arises out of the relationship γ=arctan (signal value of the first strain gauge sensor 11/signal value of the second strain gauge sensor 9).

Equally, from the two signal values afforded by the individual strain gauge sensors 9, 11, in addition to the angle of the acting force $F_G$, it is possible to ascertain the magnitude thereof, in relation to selectively the first or second strain gauge sensor measurement value. The magnitude of the vector is ascertained from the relationship $F_G = F_V / \cos(γ)$ or signal value equivalent=(signal value of the first strain gauge sensor 9)/cos γ).

Namely, a force vector has a value which includes two separate components, a magnitude and direction. The magnitude can be expressed as an amplitude, strength, or other measurement of an amount while direction can be expressed as an angle, x, y, and sometimes also z component, or other suitable measures.

Upon flexing of the carrier, the (strain gauge) sensors will generate a signal which is proportionate to the force causing the flex. Said signal will be a dimensionless, numerical item. If the sensors are calibrated, it will, however, be possible to know which force in a given direction causes the generation of which numerical item as signal. Accordingly, any sensor signal will correspond to a certain force value (in Newton, for example). The ratio of the signal strengths alone will provide you with information of the direction (angle) of the force vector. The ratio of the force values corresponding to said signal strength will provide you with the magnitude (in Newton, for example) of the force vector.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A cargo ship comprising:
a Magnus rotor for driving the ship, the Magnus rotor including a fixed support structure having an inner surface and located in an interior of the Magnus rotor, the fixed support structure being fixedly coupled to the ship and configured to mount the Magnus rotor to the ship;
a measuring device arranged on the inner surface of the fixed support structure for determining flexural loads acting on the fixed support structure and to output signals indicative of the flexural loads; and
a data processing installation coupled to the measuring device and configured to receive the signals from the measuring device, wherein the data processing installation determines:
a force vector based on the signals received from the measuring device;
using the force vector, whether the Magnus rotor is contributing to the propulsion of the ship; and
using the force vector, an adjustment to the Magnus rotor in order to increase or decrease an amount of propulsion the Magnus rotor is contributing to the propulsion of the ship.

2. The ship according to claim 1 wherein the measuring device includes first and second strain gauge sensors that are spaced at a non-zero angle relative to each other.

3. The ship according to claim 2 wherein the first strain gauge sensor is arranged with respect to an axis of rotation of the Magnus rotor in the longitudinal direction of the ship and the second strain gauge sensor is arranged with respect to an axis of rotation of the Magnus rotor in the transverse direction of the ship.

4. The ship according to claim 2 wherein the first and second strain gauge sensors are arranged in a horizontal plane.

5. The ship according to claim 2 wherein the inner surface of the fixed support structure is cylindrical where the first and second strain gauge sensors are arranged.

6. The ship according to claim 2 wherein the first strain gauge sensor and the second strain gauge sensor are each adapted to output signals representative of strain detected.

7. The ship according to claim 2 wherein the data processing installation determines at least one of:
a direction of the force vector using a ratio of a signal of the first strain gauge sensor and a signal of the second strain gauge sensor, and
magnitudes of the force vector using a ratio of the signal of the first strain gauge sensor and the signal of the second strain gauge sensor and magnitudes of the signals.

8. The ship according to claim 2 wherein at least one of the first strain gauge sensor and the second strain gauge sensor have at least one of a strain measuring strip, a strain measuring tube, and an optical strain sensor.

9. A method of determining a thrust of a Magnus rotor that is mounted to a ship by a fixed support structure, the method comprising:
securing a measuring device to an inner surface of the fixed support structure, the fixed support structure being fixedly mounted to the ship, the Magnus rotor being rotatably mounted to the fixed support structure by a bearing;
driving the ship, at least in part, by the Magnus rotor;
using the measuring device, detecting flexural loads acting on the fixed support structure while the Magnus rotor, at least in part, drives the ship;
using the flexural loads, determining whether the Magnus rotor is contributing to the propulsion of the ship; and
using the flexural loads, controlling the Magnus rotor in order to increase or decrease an amount of propulsion the Magnus rotor is contributing to the propulsion of the ship.

10. A method according to claim 9 further including one or more of the following steps:
outputting a signal representing a first flexural loading on the rotor mounting in a direction of travel of the ship detected by a first strain gauge sensor of the measuring device,
determining a first force component corresponding to the first flexural loading detected by the first strain gauge sensor as a thrust force,
outputting a signal representing a second flexural loading on the rotor mounting in a transverse direction of the ship detected by a second strain gauge sensor of the measuring device,
determining a second force component corresponding to the second flexural loading detected by the second strain gauge sensor as a transverse thrust force,
determining a direction of the overall force vector using a ratio of the strengths of the outputted signals of the first and second strain gauge sensors, and
determining a magnitude of the force vector using a ratio of the strengths of the outputted signals and the values of the outputted signals.

11. The ship according to claim 1 wherein the measuring device includes first and second strain gauge sensors.

12. The ship according to claim 11 wherein the first strain gauge sensor is arranged perpendicular relative to the second strain gauge sensor.

* * * * *